(12) United States Patent
Furno et al.

(10) Patent No.: US 6,915,087 B2
(45) Date of Patent: Jul. 5, 2005

(54) FORMATION OF UNIFORM DENSITY PATCHES IN AN ELECTROGRAPHIC REPRODUCTION APPARATUS FOR PROCESS CONTROL

(75) Inventors: Joseph J. Furno, Rochester, NY (US); Richard G. Allen, Rochester, NY (US); Matthias H. Regelsberger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/640,202

(22) Filed: Aug. 13, 2003

(65) Prior Publication Data

US 2004/0096231 A1 May 20, 2004

Related U.S. Application Data

(60) Provisional application No. 60/426,557, filed on Nov. 15, 2002.

(51) Int. Cl.⁷ .............................................. G03G 15/00
(52) U.S. Cl. ............................ 399/49; 399/72; 399/160
(58) Field of Search ......................... 399/49, 72, 301, 399/303, 15, 39, 41, 160; 347/115

(56) References Cited

U.S. PATENT DOCUMENTS

| | | | | |
|---|---|---|---|---|
| 5,278,128 A | * | 1/1994 | Hotta et al. ................. | 503/207 |
| 5,541,708 A | | 7/1996 | Tsuruoka ..................... | 399/60 |
| 6,249,656 B1 | * | 6/2001 | Watanabe et al. ......... | 399/49 X |
| 6,278,477 B1 | * | 8/2001 | Ohba ......................... | 347/251 |
| 2003/0142988 A1 | * | 7/2003 | Kimura ....................... | 399/49 |

FOREIGN PATENT DOCUMENTS

| JP | 06-289670 | * | 10/1994 |
|---|---|---|---|
| JP | 07-306553 | * | 11/1995 |
| JP | 2000-206761 | * | 7/2000 |

* cited by examiner

Primary Examiner—Sophia S. Chen
(74) Attorney, Agent, or Firm—Lawrence P. Kessler

(57) ABSTRACT

In an electrographic reproduction apparatus having a media transport mechanism for transporting media into operative association with a plurality of different color electrographic process modules, a mechanism for providing image density control signals to the logic and control unit. At least one densitometer is provided for sensing image density control patches on the media transport mechanism and producing signals representative of the density of the such image for the logic and control unit. The electrographic process modules are enabled to generate/print respectively uniform image density control patches periodically on the media transport mechanism where the patches can be read by the densitometer for providing signals to the logic and control unit for controlling print control parameters to maintain correct image density, the patches being generated/printed, one for each color, during each revolution of the media transport mechanism, in the same respective interframe following the seam on the media transport mechanism.

9 Claims, 2 Drawing Sheets

FORMATION OF UNIFORM DENSITY PATCHES IN AN ELECTROGRAPHIC REPRODUCTION APPARATUS FOR PROCESS CONTROL

CROSS REFERENCE TO RELATED APPLICATION

Reference is made to and priority claimed from U.S. Provisional Application Ser. No., 60/426,557 Filed on Nov. 15, 2002, entitled: FORMATION OF UNIFORM DENSITY PATCHES IN AN ELECTROGRAPHIC REPRODUCTION APPARATUS FOR PROCESS CONTROL.

FIELD OF THE INVENTION

This invention relates in general to the formation of a uniform density patch in an electrophotographic printing system, and more particularly to the formation of a uniform density patch for controlling and adjusting the image density to form a developed image of one or more colors, wherein the uniform density image patches are periodically imaged to a media transport mechanism where they can be read by a densitometer for controlling print control parameters to maintain correct image density.

BACKGROUND OF THE INVENTION

An electrophotographic printing system needs to continually regulate the toning/image density of the imaging subsystem by periodically reading image density and adjusting various imaging parameters to maintain the desired image density. The image density can be read and adjusted by printing a uniformly toned density patch onto a media transport mechanism and reading the density of the printed patch with a densitometer, such as for example an on-line densitometer described in copending U.S. patent application Ser. No. 60/420,514, filed Oct. 23, 2002, in the names of Runkowske, et al. In order to maintain accurate control of the image density, a density patch must be periodically imaged on the media transport mechanism and read by the on-line densitometers followed by the appropriate print control adjustments to maintain an accurate/consistent density level.

U.S. Pat. No. 5,541,708, issued Jul. 30, 1996, shows one method for laying down and reading density patches for controlling print density in an electrophotographic reproduction apparatus. With this arrangement and method, the image density patches are formed on a moving endless belt, during subsequent rotations of the endless belt, so as to be at different locations relative to the belt from a position where the density patches were previously formed in each rotation cycle of the endless belt means. The purported advantages of this arrangement and method was to prevent density readings which are adversely effected by residual response effects on the endless belt, or premature aging effects at the cite of a density patch.

SUMMARY OF THE INVENTION

In view of the above, this invention is directed to the formation of uniform density control patches for controlling and adjusting the image density to form a developed image of one or more colors, wherein the uniform density image control patches are periodically imaged to a media transport mechanism where they can be read by a densitometer for controlling print control parameters to maintain correct image density. This invention provides, in an electrographic reproduction apparatus having a media transport mechanism for transporting media into operative association with a plurality of different color electrographic process modules, a mechanism for providing image density control signals to the logic and control unit. At least one densitometer is provided for sensing image density control patches on the media transport mechanism and producing signals representative of the density of such patches for the logic and control unit. The electrographic process modules are enabled to generate/print respective uniform image density control patches periodically on the media transport mechanism where the patches can be read by the densitometer for providing signals to the logic and control unit for controlling print control parameters to maintain correct image density, the patches being generated/printed, one for each color, during each revolution of the media transport mechanism, in the same respective interframe following the seam on the media transport mechanism.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

As mentioned above, in order to maintain accurate control of the image density in an electrophotographic reproduction apparatus print job, it is a well known practice to provide density patches, periodically imaged on the media transport mechanism, such density patches being read by suitable densitometers. Information obtained from analysis of the density patches is used to provide the reproduction apparatus control with appropriate print control adjustment information to maintain an accurate/consistent density level. This invention establishes a process by which the printing system will generate/print respective density control patches (one for each color) during each revolution of the media transport mechanism. This invention also establishes that the reproduction apparatus will generate/print such density control patches in the same interframe following the seam of the media transport mechanism.

Figure 1:
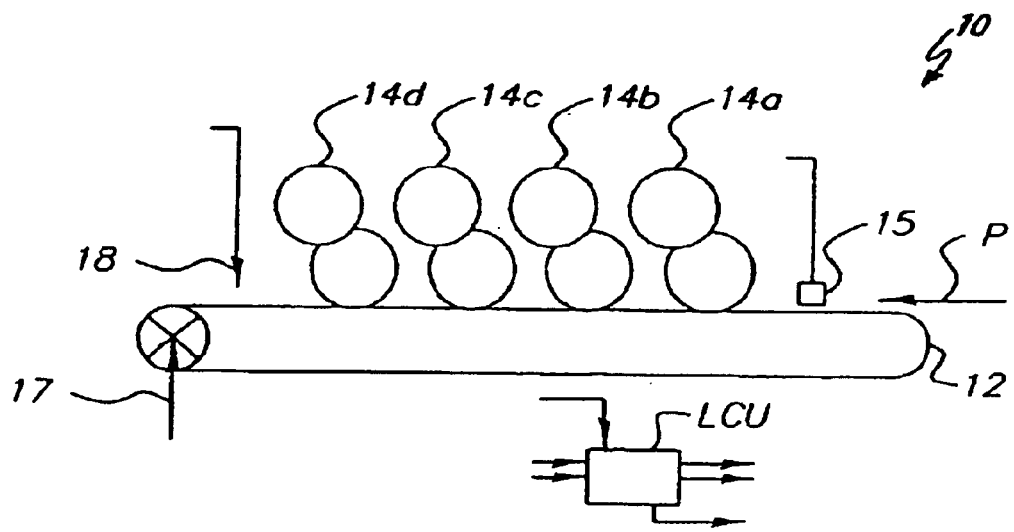
FIG. 1 is a schematic side elevational view of a multi-color electrographic reproduction apparatus suitable for practicing density patch formation according to this invention.

FIG. 1 schematically represents a portion of a multi-color electrographic reproduction apparatus 10 in which is depicted a media transport mechanism 12 (e.g., an endless web). The media transport mechanism 12, associated with a plurality of electrophotographic modules 14a–14d, is moved in a direction to transport media (e.g., sheets of paper), in the direction of arrow P, into timed operative relation with the electrophotographic modules. An encoder device 17 is provided to sense movement of the media transport mechanism 12, and a sensor 15 is provided for detecting the lead edge of media transported on the media transport mechanism. The encoder device 17 and sensor 15 provide appropriate timing control signals to a microprocessor-based logic and control unit LCU of the reproduction apparatus 10, which along with additional signals (not specifically indicated) enable timed operation of the reproduction apparatus.

The electrophotographic modules 14a–14d respectively form color images of information to be reproduced in a reproduction job. Such images are transferred sequentially to media carried by the transport mechanism 12 into operative association with the modules. After the images are transferred in superimposed relation to the media, the media is transported by the transport mechanism 12 to a downstream location to finishing apparatus, such as for example a fuser where the print is fixed on the media to complete the reproduction thereon. The transport mechanism 12 is also used to carry uniform density process control patches 16a–16d formed thereon by the respective modules 14a–14d, in the same manner in which color images are formed on media. The process control patches 16a–16d are read by densitometer(s) 18 which provides signals, corresponding to the control patch densities, to the logic and control unit LCU of the reproduction apparatus 10 in order to enable control of the printing process of the reproduction apparatus.

Figure 2A:
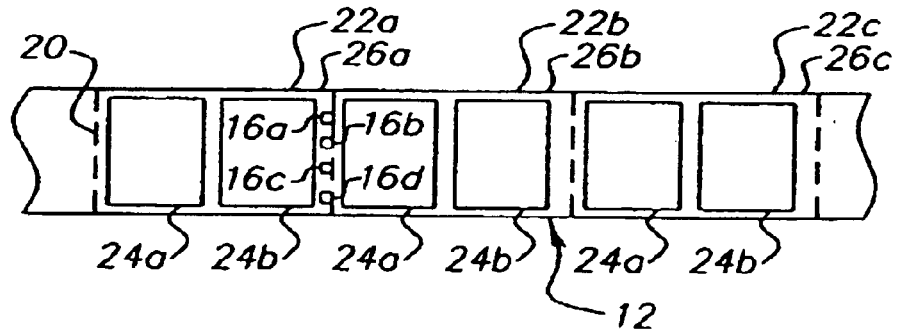
FIGS. 2A and 2B are top plan views of a media transport web with density patches formed thereon and located relative to small and large media respectively, according to this invention.

The media transport mechanism 12 is a revolving endless belt/loop, wherein the ends of the belt are bonded together to form a seam 20. FIG. 2A shows a representative portion of the media transport mechanism 12. The media transport mechanism 12 is divided into virtual frames/panels or image formation areas 22a, 22b, . . . , 22n, starting from the seam 20. Each frame/panel area can be used to contain two small size sheets of media 24a, 24b or one large size sheet of media 24c, upon which the formation of prints is accomplished. The bare transport mechanism area 26a, 26b, 26c, between frame/panel areas (and the media sheets contained therewithin) is commonly referred to as the interframe area.

A dedicated patch printing interframe 26a is a selected interframe in which image density control patches 16a–16d are printed, by the respective printing modules 14a–14d, directly on the media transport mechanism 12. The dedicated patch printing interframe 26a is located at a selected frame/panel boundary but not limited to the frame/panel boundary. This selected dedicated patch printing interframe can be changed via any suitable user-adjustable parameter. For example, if the media transport mechanism 12 has been damaged in the first dedicated interframe following the seam 20 (e.g., 26a), the user could select the second dedicated interframe following the seam (e.g., 26b) for the image density control patches to be printed. It can be seen in FIGS. 2A and 2B how image density control patches 16a–16d are respectively printed in the dedicated interframe 26a for both small and large media types. In this example, by printing the four respective patches in the interframe 26a, spaced in a cross-track direction, four densitometers are required to measure the four image density control patches respectively.

Figure 2B:
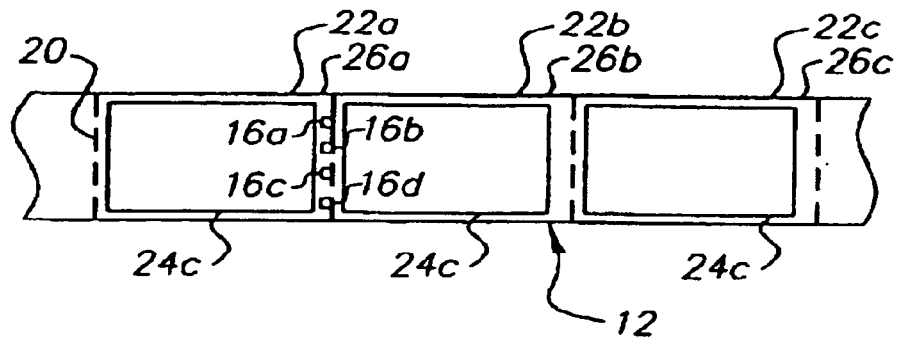
Figure 3A:
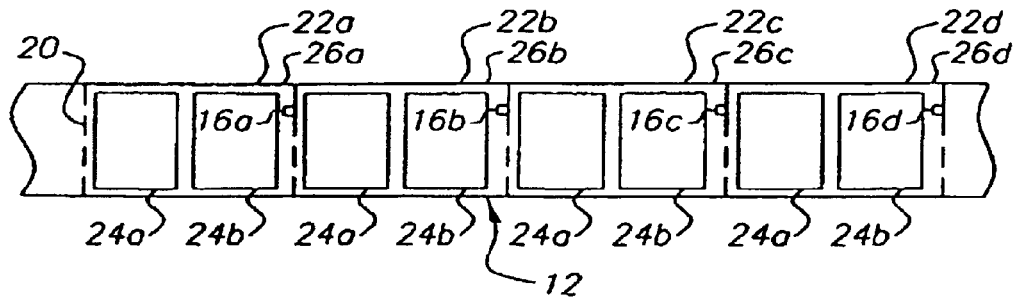
FIGS. 3A and 3B are top plan views of a media transport with an alternate location of a series of density patches formed thereon, relative to small and large media respectively, according to this invention.

The dedicated interframe image density control patch printing concept according to this invention has been enhanced, or tailored, with respect to the configuration of the reproduction apparatus 10. For example, newer technologies for densitometers provide the capability to read all process colors. Accordingly, instead of having four densitometers 18 aligned in the cross-track direction with respect to the interframe 26a of the media transporting mechanism 12 for reading four different color image density control patches (as shown in FIGS. 2A and 2B), the reproduction apparatus could be arranged to require only one densitometer (see FIG. 3A) capable of reading all process colors. Then each process color image density control patch 16a–16d could be placed in the same relative cross-track position. Therefore, this reproduction apparatus configuration would dictate that the dedicated interframe patch printing concept would be configured to have spaced respective dedicated interframes 26a, 26b, 26c, 26d for each color relative to the media transport web seam 20.

Figure 3B:
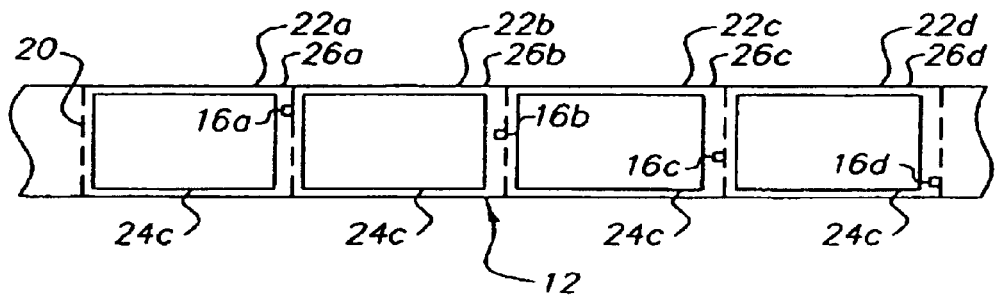

As shown in FIG. 3B, the dedicated interframe for a four densitometer system (as described above with reference to FIGS. 2A and 2B) could be changed for each process color. That is to say, the image density control patches 16a–16d may be located in dedicated interframes 26a–26d respectively. This might be due, for example, to defects in the media transport mechanism 12 or other reasons related to the interframe areas. Of course, this concept is not limited to a single dedicated interframe per media transport web revolution per color; rather the concept could be expanded to include multiple dedicated interframes for each process color based on the configuration of the reproduction apparatus or the length of the media transport web.

Figure 4A:
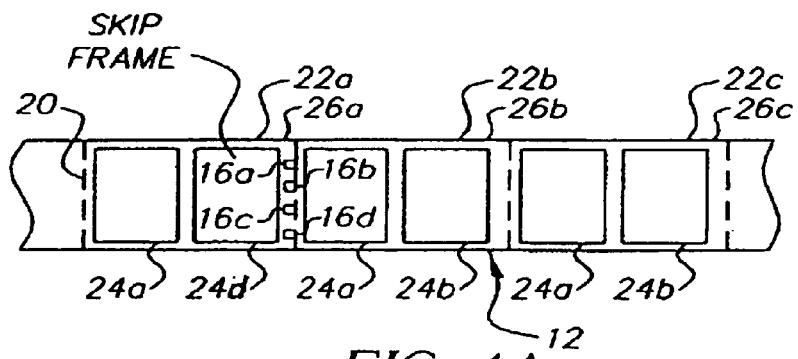
FIGS. 4A and 4B are top plan views of a media transport with still another alternate location of density patches formed thereon, relative to small and large media respectively, according to this invention.
Figure 4B:
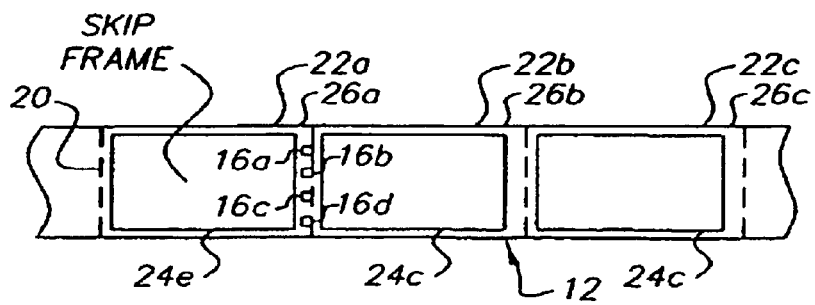

Another important aspect of this invention is the generation of "fake sheets". It is likely that during printing of a print job, or a series of print jobs, virtual frames in which no images are reproduced (i.e., skip frames 24d in FIG. 4A and 24e in FIG. 4B) would need to be introduced into the operative reproduction sequence in order to enable components of the reproduction apparatus to get ready for the next reproduction sheet to be handled. These skip frames result in media transport frames that do not contain media and would result in no image density control patches to be printed. In this case, the logic and control unit LCU for the reproduction apparatus 10 generates a "fake sheet" sequence, which mimics reproduction carried out on a real sheet. As shown in FIGS. 4A and 4B, this procedure enables the logic and control unit LCU for the reproduction apparatus to generate the necessary printing signals to print the image density control patches 16a–16d, in a four densitometer configuration, in the dedicated interframe 26a that does not contain media. Alternatively, this procedure enables the logic and control unit LCU for the reproduction apparatus to generate the necessary printing signals to print the image density control patches 16a–16d, in a single densitometer configuration, in dedicated interframes 26a–26d respectively. Thus, the reproduction apparatus 10 continually prints an image density control patch during each rotation of the media transport web 12, in the appropriate dedicated interframe, regardless whether media exists in the virtual frames/panels or image formation areas 22a, 22b, . . . , 22n or not.

Additionally, the fake sheet/dedicated interframe patch generating process can be extended prior to, and following, the printing of a print job. In these cases, no media is being fed and placed on the media transport web 12. In this case, the fake sheet/dedicated interframe patch would be generated during each revolution of the media transport web in the dedicated interframe. This feature allows periodic image density control patches to be printed, and print control adjustments responsive to the information contained in the density control patches, to be made by the reproduction apparatus logic and control unit to maintain accurate image density prior to a submitted job or a job following the submitted job.

Overall, this invention provides a mechanism for printing image density control patches (e.g., 16a–16d) periodically during each revolution of the media transport mechanism 12 in the same dedicated interframe, thus resulting in highly accurate control of image density. This invention also provides additional image density control stability by placing the image density control patch in the same interframe location. By placing the density patch in the same interframe location, the optical properties of the media transport are consistent and thus result in more accurate readings of the patch density by the densitometers.

Also, the accuracy of image density control, according to this invention, is enhanced by the ability to find/compute the density of the bare media transport mechanism. This value is then used in the calculation of the resultant patch density. The entire arrangement described above provides the ability to print image density control patches, in the dedicated interframe(s), of any density level. Using this feature for computing the bare media transport mechanism reference density, a patch of "zero" density could be requested/printed and subsequently read. This reading would result in obtaining a value of the bare media transport mechanism density in a specific dedicated interframe area. An alternate process for computing the bare media transport mechanism density is to sample the bare media transport mechanism density around one complete revolution of the mechanism (or a portion of the mechanism) and calculate an average density of all the readings for the final value of the bare media transport mechanism density.

Advantages of this invention are that it provides a deterministic process control cycle, based on image density control patches, for all job streams, and provides such process control even when no paper/job streams are running. It is user configurable based on any of a number of critical parameters to change the dedicated interframe. Consistent density readings are provided by image density control patches being printed in the same interframe location.

The invention has been described in detail with particular reference to certain preferred embodiments thereof, but it will be understood that variations and modifications can be effected within the spirit and scope of the invention.

What is claimed is:

1. In an electrographic reproduction apparatus having a media transport mechanism for transporting media into operative association with a plurality of different color electrographic process modules, said media transport mechanism being an endless web having a seam and a plurality of frames separated by interframes, and a logic and control unit for controlling operation of said electrographic process modules for faithfully reproducing multi-color information on such media, a mechanism for providing image density control signals to said logic and control unit, said mechanism comprising:

at least one densitometer for sensing an image density control patch on said media transport mechanism and producing signals representative of the density of said such image density control patch for said logic and control unit; and apparatus for enabling said electrographic process modules to generate/print respective uniform image density control patches periodically on said media transport mechanism where said patches can be read by said densitometer for providing signals to said logic and control unit for controlling print control parameters to maintain correct image density, said patches being generated/printed, one for each color electrographic process module, during each revolution of said media transport mechanism, in the same respective interframe following said seam on said media transport mechanism, and can selectively change said same respective interframe following seam to a different interframe.

2. Image density control signal mechanism according to claim 1, wherein said at least one densitometer senses said image density control patches at the same relative cross-track position, in sequential interframes.

3. Image density control signal mechanism according to claim 1, wherein said at least one densitometer senses said image density control patches at different relative cross-track positions.

4. Image density control signal mechanism according to claim 1, wherein said at least one densitometer senses said image density control patches at different relative cross-track positions, in sequential interframes.

5. Image density control signal mechanism according to claim 1, including a plurality of densitometers equal to the number of electrographic process modules.

6. Image density control signal mechanism according to claim 5, wherein said plurality of densitometers sense said image density control patches at different relative cross-track positions in the same interframe.

7. Image density control signal mechanism according to claim 5, wherein said plurality of densitometers sense said image density control patches at different relative cross-track positions in sequential interframes.

8. In an electrographic reproduction apparatus having a media transport mechanism for transporting media into operative association with a plurality of different color electrographic process modules, said media transport mechanism being an endless web having a seam and a plurality of frames separated by interframes, and a logic and control unit for controlling operation of said electrographic process modules for faithfully reproducing multi-color information on such media, a mechanism for providing image density control signals to said logic and control unit, a process for providing image density control signals to said logic and control unit, said process comprising the steps of:

generating/printing uniform image density control patches periodically on said media transport mechanism where said patches can be read by a densitometer, said generating/printing a patch occurring one for each color electrographic process module, during each revolution of said media transport mechanism, in the same respective interframe following the seam on said media transport mechanism, and wherein a frame area on said media transport mechanism containing no media is made to simulate the occurrence of media such that image density control patches can still be formed relative thereto; and providing signals from said densitometer to said logic and control unit for controlling print control parameters to maintain correct image density.

9. In the process for providing image density control signals to said logic and control unit, in the step of generating/printing uniform image density control patches periodically on said media transport mechanism where said patches can be read by a densitometer according to claim 8, a frame area on said media transport mechanism, prior to or after frame areas containing media, containing no media is made to simulate the occurrence of media such that image density control patches can still be formed relative thereto.

* * * * *